United States Patent [19]
Kacor et al.

[11] Patent Number: 5,812,129
[45] Date of Patent: Sep. 22, 1998

[54] METHOD AND SYSTEM FOR ACCESSING FUNCTIONS OF A USER INTERFACE ENVIRONMENT FROM PROCESSES RUNNING OUTSIDE OF THE USER INTERFACE ENVIRONMENT

[75] Inventors: Richard William Kacor, Coppell, Tex.; Corey O. Sellers, Orem, Utah

[73] Assignee: International Business Machines Corp., Armonk, N.Y.

[21] Appl. No.: 176,603

[22] Filed: Jan. 3, 1994

[51] Int. Cl.$^6$ ........................................ G06F 3/00
[52] U.S. Cl. ............................................... 345/339
[58] Field of Search .................... 395/700, 155

[56] References Cited

U.S. PATENT DOCUMENTS 5,307,490  4/1994  Davidson et al. ................. 395/684

OTHER PUBLICATIONS

Remote Desktop Environments Reflected in Local Desktop Windows, IBM Technical Disclosure Bulletin TDB v36 Mar. 1993, pp. 421–426.
Method to Hide Normal OS/2 User Interface for a Controlled Platform, IBM Technical Disclosure Bulletin TDB n7 Dec. 1992, pp. 296–297.

*Primary Examiner*—A. Katbab
*Attorney, Agent, or Firm*—Geoffrey A. Mantooth

[57] ABSTRACT

Functions provided by a user interface shell of a computer can be accessed by objects operating outside of the user interface shell. A server that operates within the shell is provided. The server receives a call for access to the shell functions from an object. The call contains a specified function and the name of shared memory. The server causes the function to be executed within the user interface shell. Execution of a call-return function produces data, wherein the server stores the data in the shared memory. The requesting object then retrieves the data from the shared memory for further processing.

6 Claims, 4 Drawing Sheets

METHOD AND SYSTEM FOR ACCESSING FUNCTIONS OF A USER INTERFACE ENVIRONMENT FROM PROCESSES RUNNING OUTSIDE OF THE USER INTERFACE ENVIRONMENT

TECHNICAL FIELD OF THE INVENTION

The present invention relates to user interfaces for data processing systems such as shell user interfaces and functions that execute thereon.

BACKGROUND OF THE INVENTION

A data processing system, such as a personal computer, is provided with a user interface for ease of use. A common type of user interface is provided to a display screen in the form of a desktop. With a desktop user interface, a representation of a physical desktop is shown, which representation is populated with various objects. The objects are shown as icons or windows (or panels).

There is typically a dominant user interface that is provided by the operating system of the computer. This dominant user interface is referred to as a shell. For example, with the OS/2 operating system, the user interface shell is known as the WORKPLACE SHELL (OS/2 and WORKPLACE SHELL are trademarks of International Business Machines Corporation). With the MSDOS operating system, the user interface shell is known as the WINDOWS shell.

When a programmer writes an application program for a computer, the programmer often wishes to have the application program run or execute outside of the user interface shell. This is because writing and debugging a program to run within the user interface shell is more complicated. In addition, there is the disadvantage that if the user interface shell experiences a problem while executing or while being utilized by another application program, then the entire computer system suffers that same problem. Thus, writing an application program to run outside of the user interface shell provides more reliability in terms of run time. However, writing an application program to run outside of the user interface shell prohibits the programmer from using those user interfaces that are specific to the shell.

SUMMARY OF THE INVENTION

It is an object of the present invention to provide a method and system that allows a program to run outside of a user interface shell while accessing component portions of the user interface shell.

The present invention provides a method and system for accessing functions of a user interface environment in a data processing system. A request by an object operating outside of the user interface environment to utilize one of the functions in the user interface environment is received. The one specified function is performed within the user interface environment so as to produce a result. The result is the provided to the requesting object through a call return mechanism.

In accordance with one aspect of the present invention, the result is provided to the requesting object by providing the result to shared memory. The memory is shared between the requesting object and the providing or serving object within the user interface environment.

In still another aspect of the present invention, a set of functions of the user interface environment is provided. The request specifies which particular function in the set of functions that is to be performed.

In accordance with another aspect of the present invention, there is provided a method of accessing functions of a first object located on a data processing system. A second object is executed on the data processing system independently of the first object. A request is produced from the second object. The request includes one of the functions. The request is received by a third object, wherein the third object causes the one function to be performed within the first object so as to produce a result. The result is provided from the third object to the second object.

In accordance with another aspect of the method of the present invention, the step of producing a request from the second object further includes providing a name of shared memory in the request, and the step of providing the result from the third object to the second object further includes providing the result to the shared memory. In accordance with still another aspect of the present invention, the result is retrieved from shared memory and utilized in further processing by the second object. In still another aspect of the present invention, the shared memory is cleared before the request is produced by the second object.

In still another aspect of the present invention, a data processing system is provided. The data processing system includes first, second and third objects. The first object includes a user interface shell and functions. The second object executes on the data processing system independently of the first object. The third objects executes on the data processing system within the first object. The third object includes means for processing a request from the second object to utilize one of the functions and means for providing information relating to the utilization of the one function to the second object.

The present invention provides a server or stub located inside of a user interface shell. The server acts as an interface into the interface shell for objects that are executing outside of the shell. With the server of the present invention, an object is able to access functions inside of the user interface shell. Should the user interface shell encounter a problem, then the object can continue to be utilized because it executes outside of the shell. In addition, because only a few components of the shell are utilized by the object, programming and debugging the object are made simpler.

DESCRIPTION OF THE INVENTION

Figure 1:
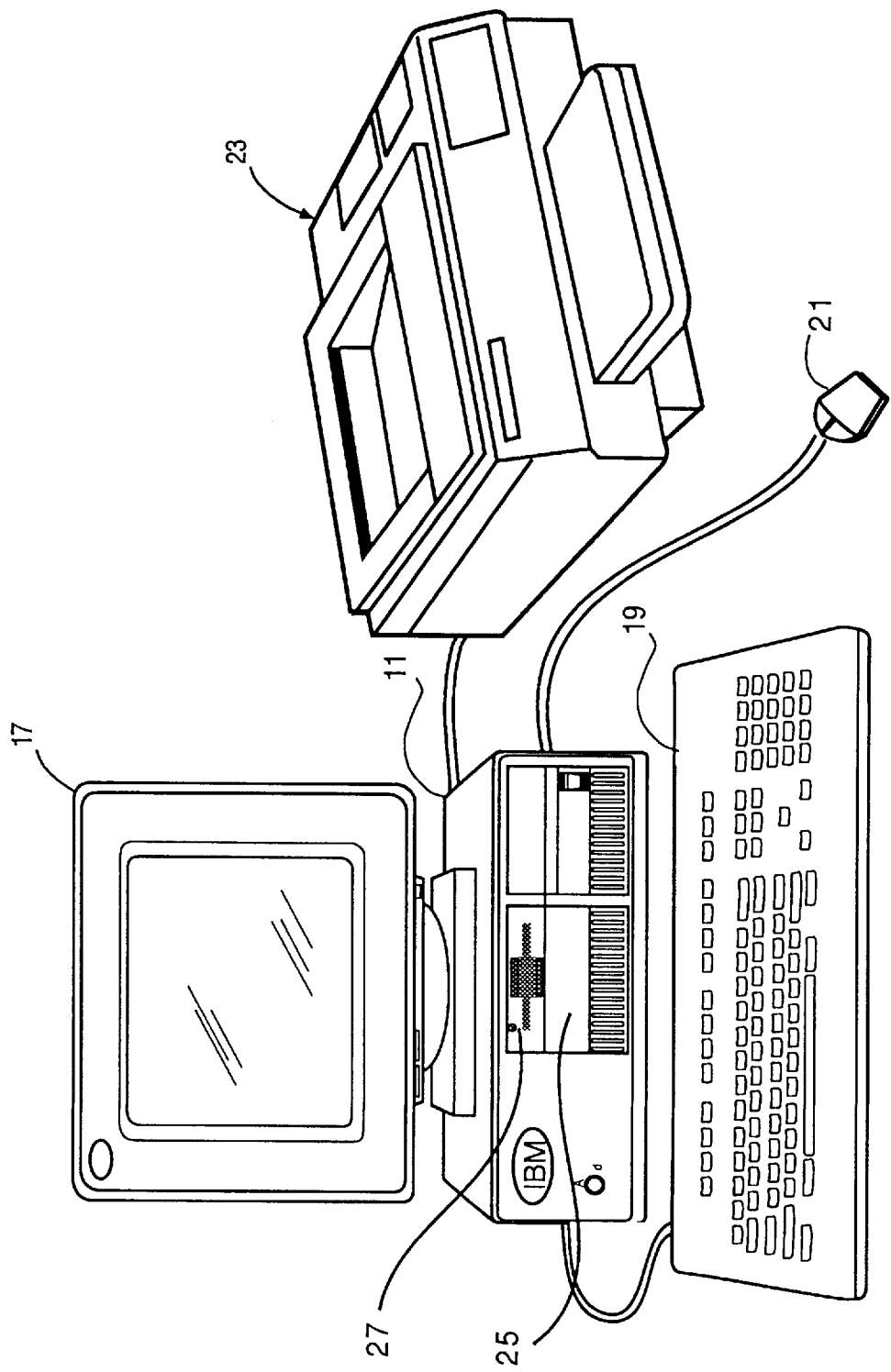
FIG. 1 is a schematic diagram of a personal computer system on which the present invention can be practiced.

In FIG. 1, there is shown a schematic diagram of a personal computer 11 or data processing system, upon which the present invention can be practiced. The computer 11 includes input devices such as a keyboard 19 and a mouse 21, and output devices such as a display screen 17 and a printer 23. The computer 11 also includes a hard disk drive 25 and a floppy disk drive 27.

Figure 2:
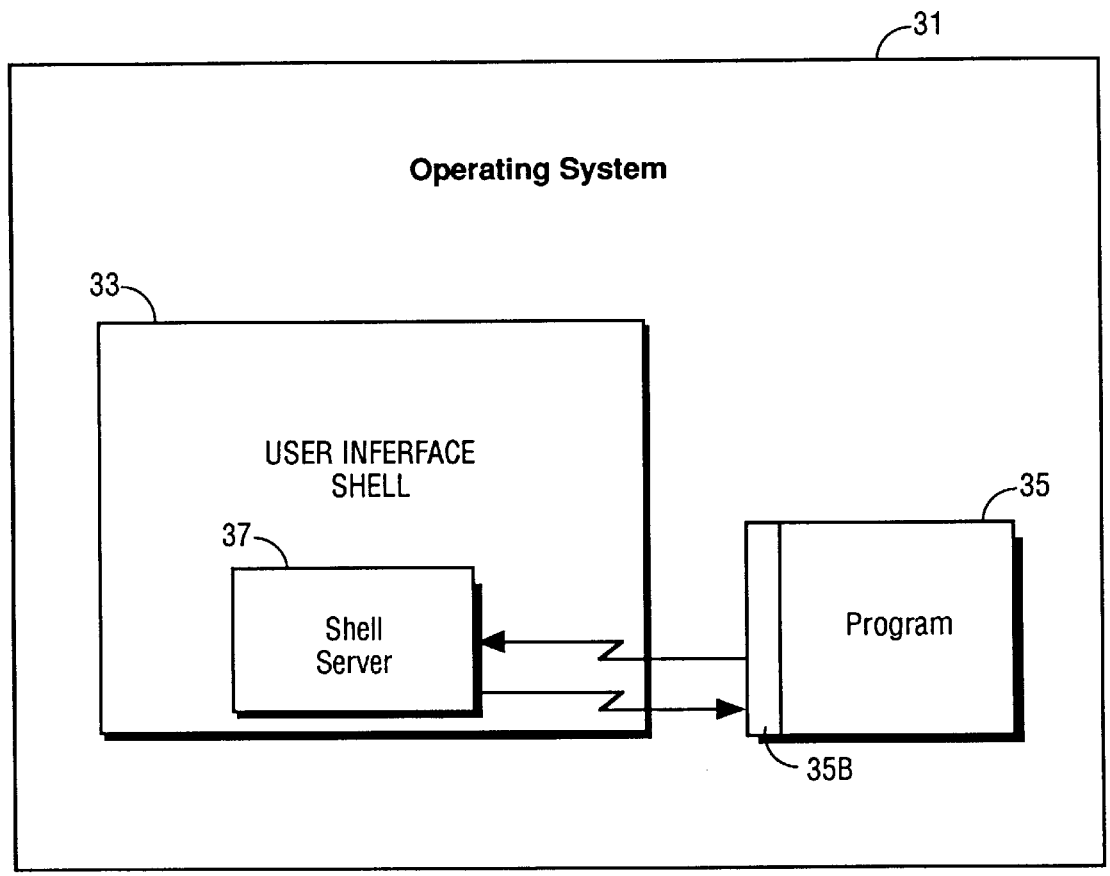
FIG. 2 is a schematic diagram showing the relationship between the user interface shell, the shell server and a program operating outside of the user interface shell. The program accesses functions of the shell rough the server.

In addition, the computer has internal memory in the form of Random Access Memory (RAM). The RAM memory stores resource objects for execution and access by a central processing unit (CPU) located within the computer 11. Examples of resource objects are shown in FIG. 2. One such resource object is an operating system 31. The operating system is loaded into the RAM when the computer is powered on or restarted. In general, the operating system manages subsystems of the computer, controls programs executing the computer and processes commands provided to the computer. In the preferred embodiment, the operating system is OS/2, which provides multitasking operations. However, the operating system need not provide multitasking operations for the present invention to be utilized.

Figure 3:
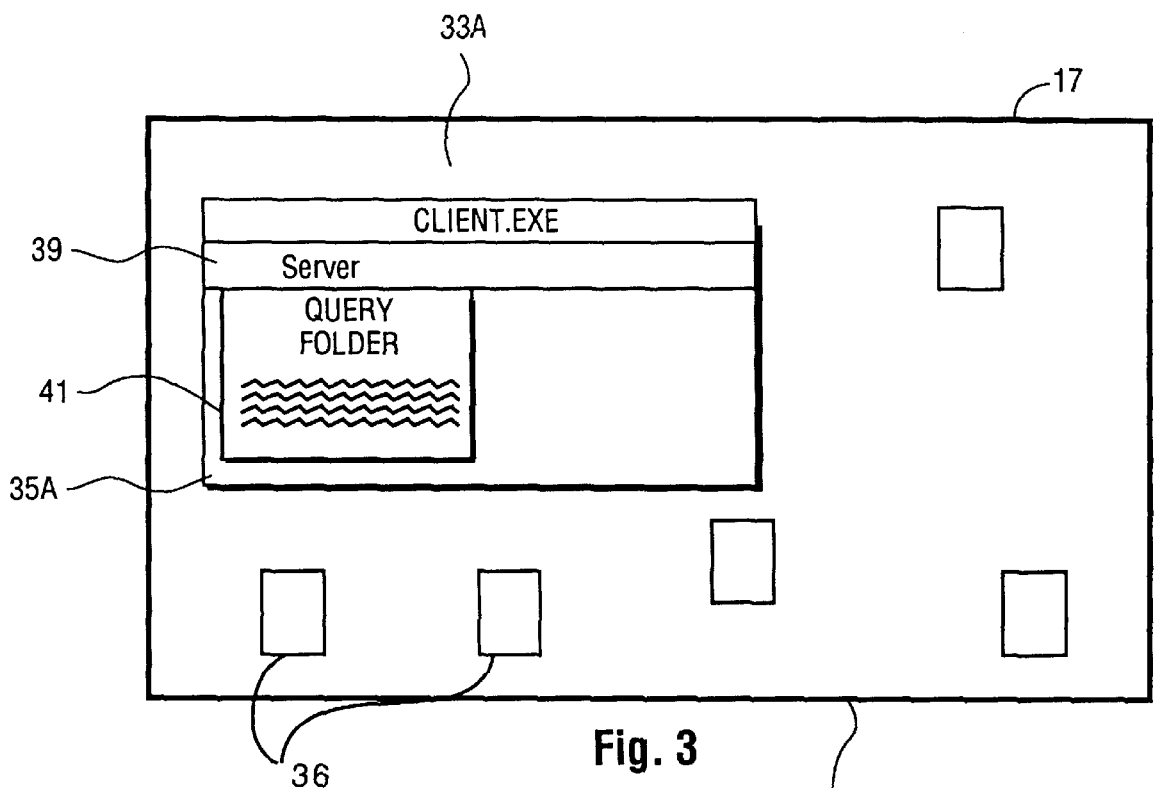
FIG. 3 is a schematic view of a screen showing a user interface for the program of FIG. 2 before the user interface shell has been accessed.

Another resource object is the user interface shell 33. For the OS/2 operating system, the user interface shell is known as the WORKPLACE SHELL (WPS). The user interface shell provides a user interface that is displayed on the screen. For example, a typical user interface provided by the shell 33 is a desktop 33A, which is shown in FIG. 3. The desktop is populated with objects 36 in the form of icons and windows. (The desktop 33A in FIG. 3 is shown as being unfocused, wherein the desktop is not receptive to a user input.)

Another resource object is a program 35 (see FIG. 2). The program executes in conjunction with (or within) the operating system 31. However, the program 35 executes outside of, or independently of, the environment created by the user interface shell 33. Thus, if the user interface shell 33 encounters a problem and traps or locks up (wherein further execution of the user interface shell is prohibited), then the program 35 can continue its execution. Referring to FIG. 3, a user interface 35A in the form of a window is provided for the program 35. The window 35A is focused, indicating that it is enabled to receive user input.

Still another resource object is the shell server 37 (see FIG. 2). The shell server 37 executes within the user interface shell 33 and serves as a stub to interface with the program 35.

Figure 4:
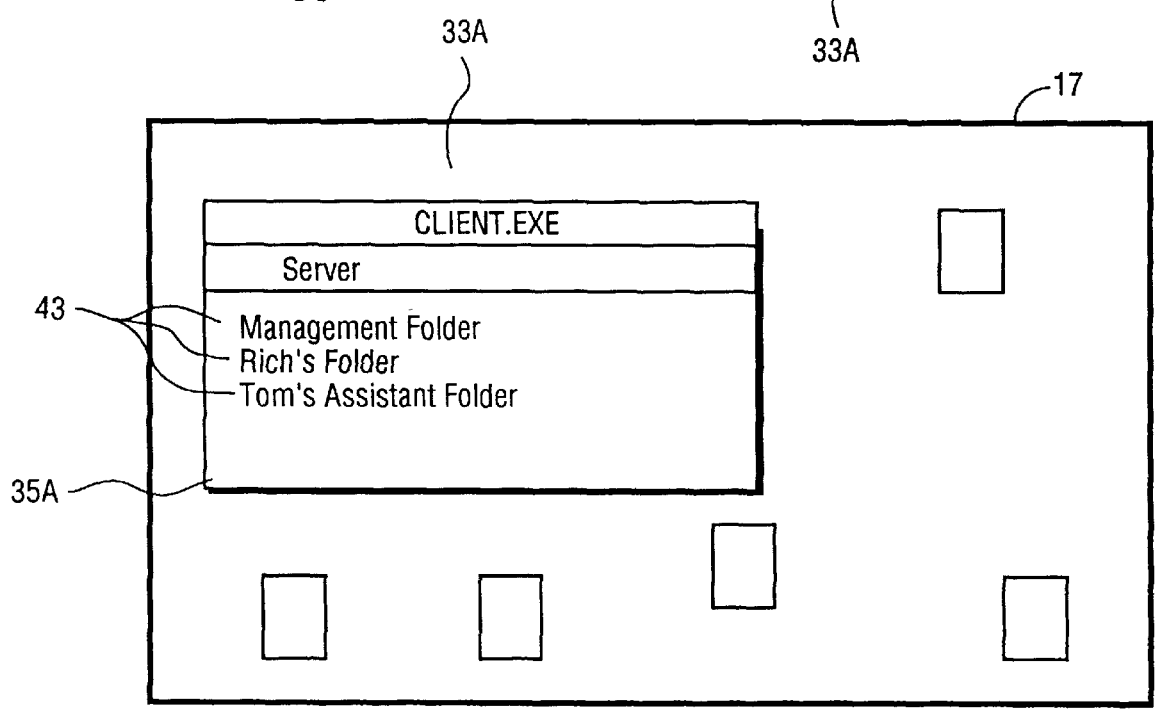
FIG. 4 is a schematic view of a screen showing a user interface for the program of FIG. 2 after the user interface shell has been accessed.

An example of the present invention will be described, referring to FIGS. 3 and 4. Suppose that a user wishes to view a list of all folders present on the computer system. The user opens the window 35A of FIG. 3. The user then selects "server" 39 to view a pull down menu 41. The pull down menu lists available functions. The user selects the QUERY FOLDERS function. The user then invokes the function by, for example, pressing the "ENTER" key or clicking a mouse button. This invokes a portion 35B of the program 35 (see FIG. 2) that communicates with the server 37. The program portion 35B formulates a request and sends the request to the server 37. The server 37 executes the function inside of the shell 33 and returns a list of all of the folders in the system. As shown in FIG. 4, this information is then utilized by the program 35 to display the list 43 of folders in the window 35A.

The operation of the present invention will now be described. First, the shell server 37 is registered. Registration of the shell server includes creating an object within the user interface shell 33, and providing that object with a handle or name. In addition, a list of functions is provided. These functions are functions that can be carried out by the user interface shell. For example, with the WPS shell, the following functions (which are accompanied by explanations) can be utilized:

WPSQueryPath
   Given a handle to an object, this function will return its physical path or directory.
WPSQueryTitle
   Given a handle to an object, this function will return its title, which is the text shown under the icon that represents the object.
WPSQueryFolder
   Given a handle to an object, this function will return the handle to the folder that the object is located in.
WPSQueryContent
   Given a handle to a folder and a classification name, this function will return a list of handles of all objects of that classification in that folder.
WPSQueryVariable
   Given a handle to a folder and an identification of an instance variable, this function will return the contents of that variable. An example of an instance variable is the time when the object was created.
WPSQueryClass
   Given a handle to an object, this function will return its classification. The classification is typically utilized to provide a hierarchical arrangement between objects.
WPSQueryFolders
   This function will return a list of all of the folders in the system.
WPSQueryObjects
   Given a classification, this function will return a list of handles of all of the objects of that classification.
These functions, when executed, provide information on objects. Other functions of a user interface shell could be used.

The shell server can be represented as a window (or an icon) in order to provide editing capabilities. A user may wish to edit the name of the server or the list of functions. In addition, plural servers can be used with a single user interface shell.

After the shell server has been registered, it can be utilized by any program executing outside of the user interface shell in order to gain access to the listed shell functions. The utilization of the shell server will now be described with reference to the flow chart of FIG. 5. In the flow chart, the following graphical conventions are observed: a rectangle is used to illustrate a process or function, and a jagged line is used to illustrate a communication link. These conventions are well understood by programmers skilled in the art of user interfaces and the flow charts are sufficient to enable a programmer skilled in the art to write code in any suitable computer programming language, such as PASCAL or C for a computer such as the IBM Personal System /2 (PS/2) family of computers which supports these languages. (Personal System /2 is a trademark of International Business Machines Corporation.)

Figure 5:
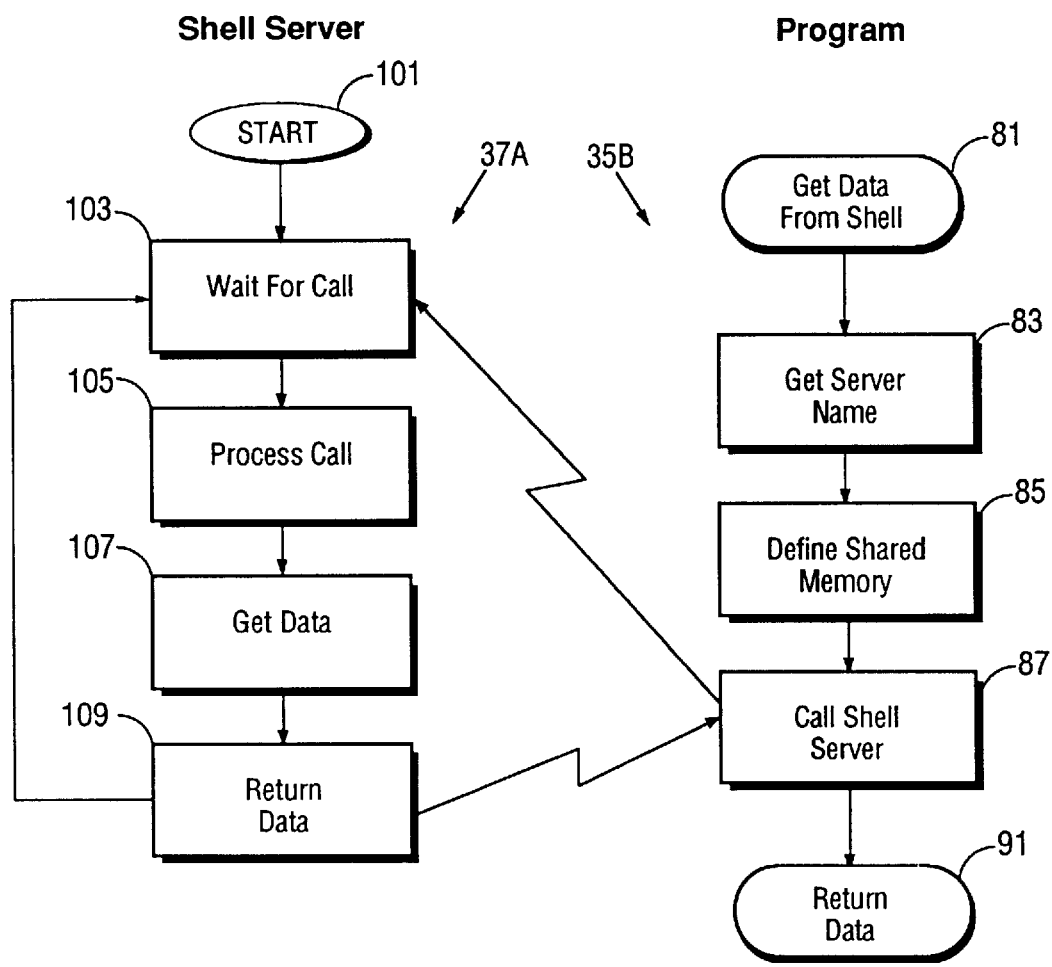
FIG. 5 is a flow chart showing the method of the present invention, in accordance with a preferred embodiment.

The flow chart of FIG. 5 is shown in two portions. The right portion is referred to as the program side 35B. The left portion is referred to as the shell server side 37A. The program side will be discussed first.

The program side 35B shown in FIG. 5 is just one portion 35B of the program 35 as shown in FIG. 2. The program can be any type of program, such as a spreadsheet program or a word processor program. The portion 35B shown in FIG. 5 interfaces or communicates with the shell server 37. This portion 35B is shown on the right side of FIG. 5 as a routine. In step 81, the routine is started. The routine can be called by other portions of the program 35 and can therefore be called as often as the shell functions are needed. The routine is started when another portion of the program requires data which can be provided by functions in the user interface shell.

In step 83, the shell server name is obtained. The name of the shell server 37 can be coded into the routine 35B. Alternatively, to allow greater flexibility, a query can be made for the shell server name. The shell server is typically of a certain classification of objects. A query of the classification of objects can be made utilizing an information file and the operating system.

In step 85, a block of shared internal memory is defined. The memory is shared by the program 35B and by the shell server 37A in order to provide a transference of data out of the user interface shell. The shared memory is in RAM and is typically 4 Kbytes, although a larger or smaller number of bytes can be specified. This block of memory is given a name. In addition, the block of shared memory is cleared.

The obtaining of the shell server name and the allocation of shared memory need only be performed once. Thus, for subsequent iterations of the routine 35B, steps 83 and 85 can be bypassed. However, the shared memory is still cleared for each iteration of the routine.

In step 87, the shell server is called. The call includes the name of the shell server 37, the name of the shared memory and the desired function or functions which are to be performed. While making the call, the method 35B waits for the data to be placed in shared memory. This is a call-return mechanism implemented through the WORKPLACE SHELL WP Setup function.

Once data has been loaded into the shared memory, the routine stops, step 91. Once the WP Setup function call returns, other portions of the program 35 can then access and utilize the data in the shared memory. For example, referring back to FIGS. 2 and 3 and the accompanying discussion, the data stored in the shared memory by the server is the names of all of the folders in the computer system. The other portions of the program access this data and display it as shown by reference number 43 of FIG. 4.

The server side of the flow chart of FIG. 5 will now be discussed. The server is started, step 101, whenever the user interface shell is started. The user interface shell may be executed automatically, such as when the computer is powered on, or it may be executed by way of a user command.

After starting, the server waits for a call, step 103. Such a call is provided by step 87. When a call is received, it is processed, step 105. Processing a call involves parsing the call to determine what function or functions are to be executed and the name of the shared memory. In the example given above, the function was WPSQueryFolders.

After the function has been identified, the function is executed within the user interface shell, step 107. The execution of the function produces information. The resulting information, which is typically data, is returned to the program 35 by storing it in the shared memory, step 109. The shared memory is identified by the memory name that was sent with the call by step 87. After step 109, the server method returns to step 103 to await another call.

The foregoing disclosure and the showings made in the drawings are merely illustrative of the principles of this invention and are not to be interpreted in a limiting sense.

What we claim is:

1. A method of accessing functions of a user interface environment in a computer, said user interface environment operating within an operating system of said computer, said user interface environment being structured and arranged to display a user interface on a display that is connected to said computer, said method being performed on said computer, comprising the steps of:

a) providing an object in said computer, said object operating outside of said user interface environment, but within said operating system;

b) receiving a request from said object to utilize one of said functions in said user interface environment;

c) performing said one function within said user interface environment and on said computer so as to produce a result; and d) providing said result to said object.

2. The method of claim 1 wherein:

a) said step of receiving a request from said object to utilize one of said functions in said user interface environment further comprises the step of determining from said request a location of a shared memory portion; and b) said step of providing said result to said object further comprises the step of providing said result to said shared memory portion.

3. The method of claim 1 further comprising the steps of:

a) providing a set of said functions of said user interface environment before said step of receiving a request from said object is performed; and b) determining from said request which particular function in said set of functions corresponds to said one of said functions.

4. A system for accessing functions of a user interface environment in a computer, said user interface environment operating within an operating system of said computer, said computer having an object operating thereon, said object operating outside of said user interface environment, but within said operating system, said user interface environment displaying a user interface on a display that is connected to said computer, comprising:

a) means for receiving a request from said object to utilize one of said functions in said user interface environment;

b) means for performing said one function within said user interface environment and on said computer so as to produce a result, said means for performing said one function being coupled to said means for receiving a request; and c) means for providing said result to said object, said means for providing said result being coupled to said means for performing said one function.

5. The system of claim 4 wherein:

a) said means for receiving a request from said object to utilize one of said functions in said user interface environment further comprises means for determining from said request a location of a shared memory portion; and b) said means for providing said result to said object further comprises means for providing said result to said shared memory portion.

6. The system of claim 4 further comprising:

a) means for providing a set of said functions of said user interface environment; and b) means for determining from said request which particular function in said set of functions corresponds to said one of said functions.

* * * * *